(12) United States Patent
Passarotto

(10) Patent No.: US 7,331,638 B2
(45) Date of Patent: Feb. 19, 2008

(54) SPOKED WHEEL FOR A BICYCLE

(75) Inventor: Maurizio Passarotto, Rovigo (IT)

(73) Assignee: Campagnolo, S.r.l., Vicenza (IT)

(*) Notice: Subject to any disclaimer, the term of this patent is extended or adjusted under 35 U.S.C. 154(b) by 82 days.

(21) Appl. No.: 10/812,140

(22) Filed: Mar. 29, 2004

(65) Prior Publication Data

US 2004/0227391 A1 Nov. 18, 2004

(30) Foreign Application Priority Data

Mar. 28, 2003 (EP) .................................. 03425196

(51) Int. Cl.
*B60B 1/02* (2006.01)
*B60B 21/06* (2006.01)

(52) U.S. Cl. .......................................... 301/58; 301/56

(58) Field of Classification Search ............ 301/55–56, 301/58, 104, 6.5, 67, 73
See application file for complete search history.

(56) References Cited

U.S. PATENT DOCUMENTS

| 480,022 A | * | 8/1892 | Levedahl | ..................... 301/6.5 |
|---|---|---|---|---|
| 556,124 A | * | 3/1896 | Wolff | ........................... 301/58 |
| 1,474,631 A | * | 11/1923 | House, Jr. | ..................... 301/55 |
| 1,642,207 A | | 9/1927 | Jones | |
| 1,748,168 A | * | 2/1930 | Booth | ........................... 301/55 |
| 1,748,630 A | * | 2/1930 | Booth | ........................... 301/58 |
| 1,945,647 A | * | 2/1934 | Le Jeune | ..................... 301/104 |
| 2,042,714 A | * | 6/1936 | Hunt | ............................. 301/73 |
| 2,525,219 A | * | 10/1950 | Green | ........................... 301/58 |
| 5,228,756 A | * | 7/1993 | Krampera | ..................... 301/58 |
| 6,238,008 B1 | | 5/2001 | Forsythe et al. | |
| 6,382,734 B1 | * | 5/2002 | Passarotto | ..................... 301/55 |
| 6,443,532 B1 | * | 9/2002 | Cheng | ........................... 301/55 |
| 6,722,743 B2 | * | 4/2004 | Meggiolan | .................... 301/55 |
| 2002/0074853 A1 | | 6/2002 | Krampera | |

FOREIGN PATENT DOCUMENTS

WO 02053395 7/2002

* cited by examiner

*Primary Examiner*—Jason R. Bellinger
(74) *Attorney, Agent, or Firm*—Volpe and Koenig P.C.

(57) ABSTRACT

A spoked wheel for a bicycle is described herein, comprising a hub, a rim and a plurality of spokes that connect the hub to the rim. The spokes comprise a first set of spokes arranged on one side of the wheel, made up of spokes connected to a first portion of the hub, and a second set of spokes arranged on the other side of the wheel, made up of spokes connected to a second portion of the hub. The second hub portion is set at an axial distance from said first portion. The spokes of the first set are grouped together into pairs set at angular distances apart from one another with the spokes of each pair that have their outer ends set close to one another.

38 Claims, 10 Drawing Sheets

SPOKED WHEEL FOR A BICYCLE

FIELD OF THE INVENTION

The present invention relates to a spoked wheel for a bicycle, particularly one that comprises a hub, a rim, and a plurality of spokes that connect the hub to the rim. The spokes comprise a first set of spokes arranged on one side of the wheel, made up of spokes connected to a first portion of the hub, and a second set of spokes connected to a second portion of the hub set at an axial distance from said first portion and are arranged on the other side of the wheel.

BACKGROUND

Recent studies and research have been aimed at identifying new configurations of spoked wheels for bicycles leading to better performances of the wheel, as well as creating an original and innovative aesthetic effect.

Research in the field of spoked wheels for road racing bicycles has been directed to identifying increasingly important solutions that optimally reduce weight and increase the static and dynamic stability of the wheel. Research has also been directed to increasing structural strength and reduction in the risks of failure of the spokes of the wheel.

The spokes of road racing wheels make a substantial contribution to maintaining the static and dynamic stability of the bicycle wheel. Particularly in rear wheels, the spokes are responsible for transmitting the driving torque from the hub to the rim of the wheel. The driving torque transmission should occur with the maximum possible efficiency, and with minimum deformations, so as not to dissipate the energy exerted on the pedals by a cyclist. Finally, the desired results should be achieved with the minimum weight possible and without introducing risk factors for failure in the spokes. From this standpoint, a particularly critical factor is the tensioning of the spokes during wheel assembly. One of the purposes of said tensioning is to guarantee that the rim will always remain "centered" or "true", i.e., it will not shift away from a median plane of the wheel orthogonal to the axis of the hub and equidistant from the ends of the hub itself. Thus, the spokes of a typical spoked wheel include a first set of spokes on one side of the wheel, connected to a first hub portion, and a second set of spokes on the other side of the wheel, connected to a second hub portion. The second hub portion being set at an axial distance from the first portion. Consequently, the spokes on the two sides of the wheel have an inclination or camber angle with respect to the median plane of the wheel. This inclination causes the spoke tensioning to give rise to components of force in a direction parallel to the axis of the wheel. Balancing of the components of force keeps the rim in the centered or true condition. Spoke tensioning is most critical in wheels where the spokes on the two sides of the wheel present different camber angles. This is typically the case for spokes of the rear wheel. A rear wheel hub carries at one end, a sprocket cassette. The spokes set on the side of the wheel bearing the sprocket cassette have camber angles or inclinations that are considerably smaller than the camber angles or inclinations of the spokes on the other side. Obviously, the spokes with smaller inclinations must be tensioned more than the spokes on the other side in order to guarantee the centered position of the rim. This higher tensioning gives rise to a greater risk of failure of the individual spoke itself. Different spoke camber angles on the two sides of the wheel is not unique to rear wheels. It exists in general in any wheel, whether rear or front, in which the hub is partially occupied, for instance, by the disk of a disk brake.

SUMMARY

The present invention provides a spoked wheel comprising a rim, a hub having a first anchoring portion and a second anchoring portion for anchoring spokes and a plurality of spokes that connect the hub to the rim. A first set of spokes are connected to the first anchoring portion and a second set of spokes is connected to the second anchoring portion. The wheel comprises at least two spokes wherein at least one of the two sets of spokes are grouped together to form a pair that has no spoke of the other set interposed. Further advantageous characteristics of the spoked wheel according to the invention are specified below.

BRIEF DESCRIPTION OF THE DRAWINGS

Further characteristics and advantages of the invention will emerge from the following description with reference to the appended drawings, which are provided purely by way of non-limiting example and in which.

DETAILED DESCRIPTION OF THE PREFERRED EMBODIMENTS

Figure 1:
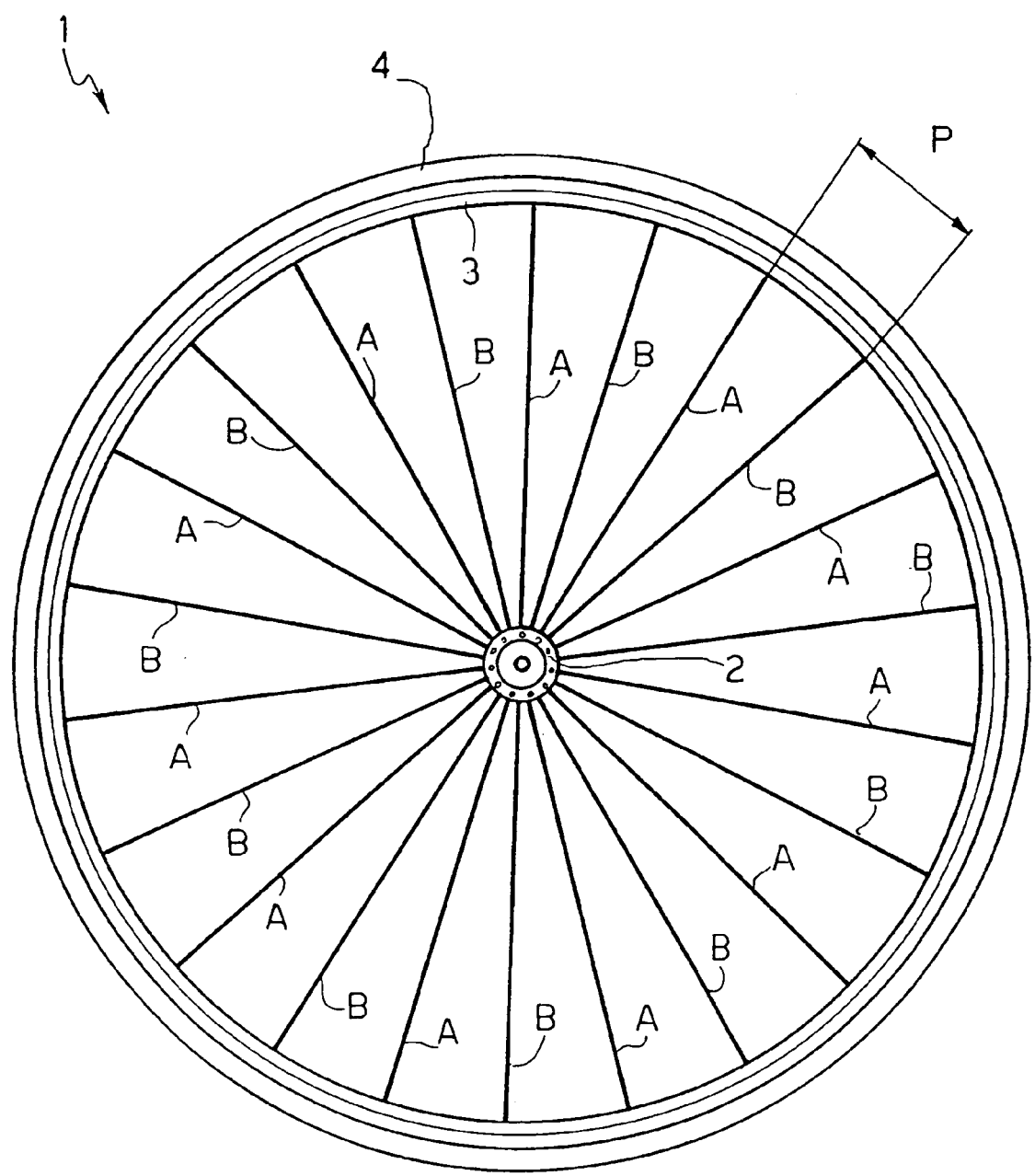
FIG. 1 illustrates a spoked wheel for a bicycle according to the prior art, viewed in the direction of the axis of the wheel.

With reference to FIG. 1, illustrated therein is a conventional bicycle wheel, designated as a whole by the reference number 1. The wheel comprises a hub 2, a rim 3 on which a tire 4 can be mounted, a plurality of spokes A belonging to a first set, which connect one side 2a of the hub 2 to the rim 3, and a plurality of spokes B belonging to a second set, which connect the other side 2b of the hub 2 to the rim 3. As viewed in the direction of the wheels axis, spokes A of the first set alternate with the spokes B of the second set. In a conventional wheel, the spokes are uniformly distributed along the rim, and the distance, or pitch, between two adjacent spokes that belong to two different sets, is designated by P. It is evident that the pitch P depends upon the total number of spokes that form the wheel and that it is given by C/N, where C is the internal circumference of the rim and N is the total number of spokes of the wheel.

Alternatively, FIGS. 2 to 7, and 9 to 10, illustrate alternate embodiments of the wheel according to the invention, considering that other and different embodiments are possible, all of which are comprised within the scope of the present invention.

In said figures, the parts that are in common or correspond to those illustrated in FIG. 1 are designated by the same reference numbers.

The present description will not go into any detail of the structure and conformation of the hub 2 and of the rim 3, since these elements are known and the structure of these components alone does not fall within the scope of the present invention. Likewise, the mechanical fastening or physical way in which each spoke is connected, at one end, to the hub 2 and, at the other end, to the rim 3, is not illustrated in detail. Any known technique suitable for this purpose can be used. The elimination of said constructional details from the drawings makes the latter easier and faster to understand the invention.

Figure 2:
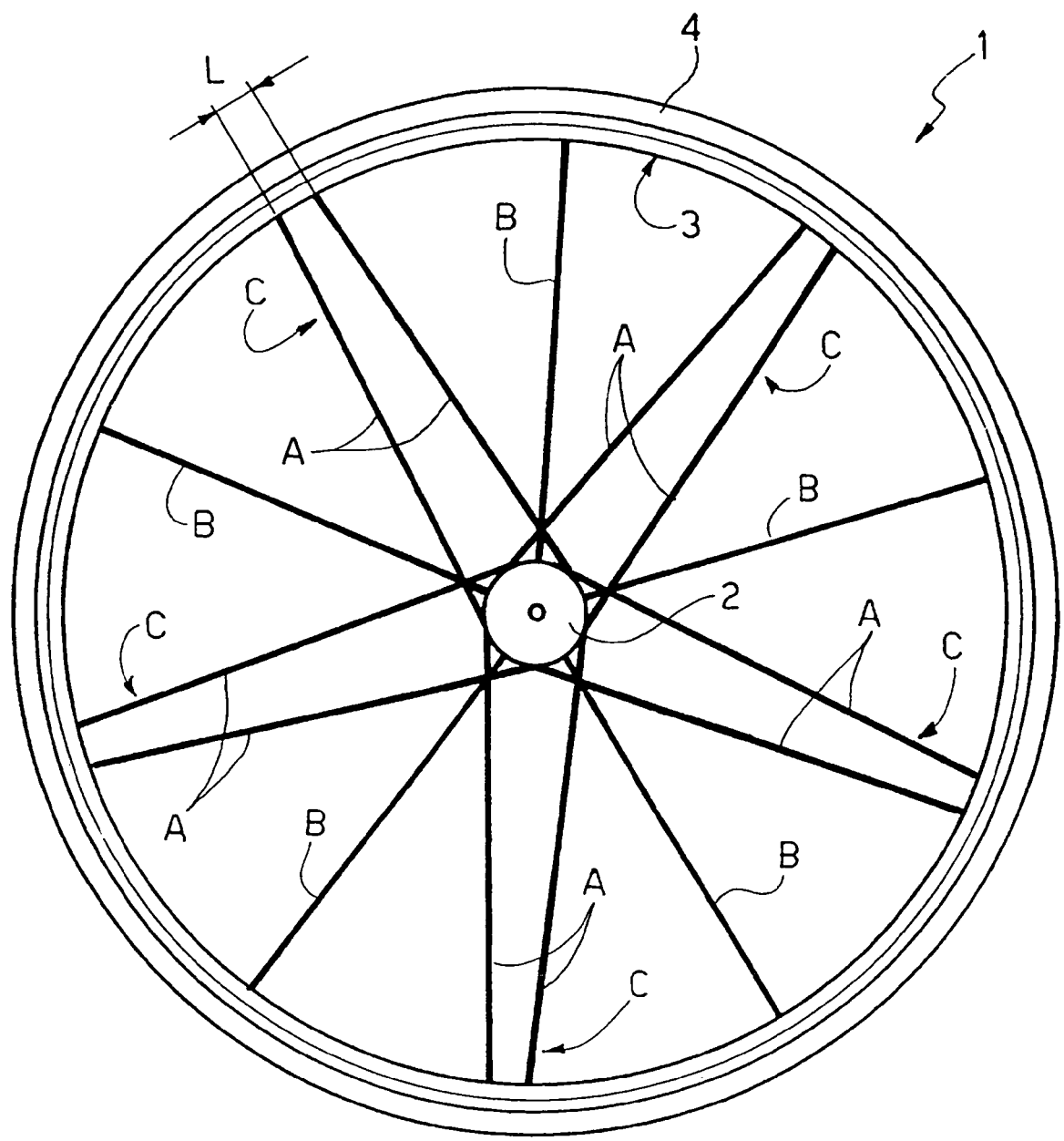
FIG. 2 illustrates a first embodiment of the wheel according to the invention, viewed in the direction of the axis of the wheel.
Figure 3:
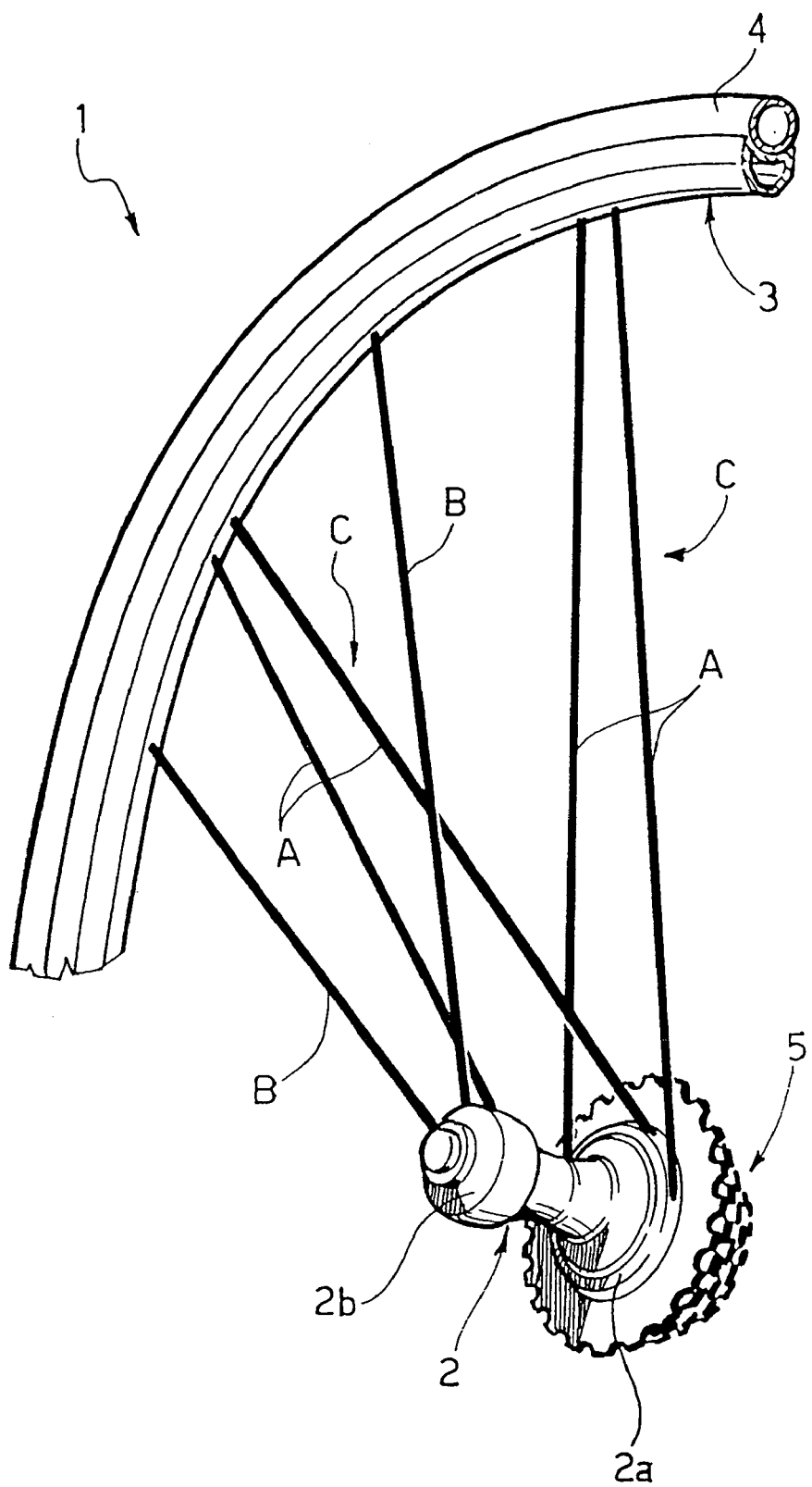
FIG. 3 is a perspective view, of a detail of the wheel illustrated in FIG. 2.

FIGS. 2 and 3 refer to the use of the invention with a rear bicycle wheel, in which a sprocket cassette 5 is associated with the hub 2. This cassette comprises a plurality of sprockets designed to selectively engage the drive chain of the bicycle in a conventional way.

The spokes that connect the hub to the rim of the wheel according to the invention are arranged in first and second sets, on the two opposite sides of the wheel. The spokes of the first set, designated by A, are connected to one end 2a of the hub 2 adjacent to the sprocket cassette 5, and the spokes of the second set, designated by B, are connected to a portion 2b of the hub 2, set at an axial distance from the end 2a.

In all the embodiments of the wheel according to the invention, the spokes A of the first set are grouped together into a plurality of pairs C, which, in the example illustrated, are set at an equal distance one from the other. FIG. 2 shows five pairs C of spokes A, but the number of said pairs C may vary widely, for instance between a minimum of four pairs and a maximum of fourteen pairs.

By "pair of spokes C" is meant that, contrary to the traditional wheel of FIG. 1, between two spokes belonging to the same set, specifically between two spokes A, no spokes are interposed that belong to the other set, in this case spokes B. Furthermore, the spokes of each pair C are also brought close together, i.e., the distance L between the outer ends of the two spokes A of each pair C, or between the points of attachment to the rim 3, is smaller than the pitch P of a conventional wheel having the same total number of spokes, where P is given by C/N, C being the internal circumference of the rim and N being the total number of spokes of the wheel. In one preferred embodiment, the distance L between spokes A of pair C is less than or equal to 60% of pitch P. In a second preferred embodiment, the distance L is equal to or less than 40% of said pitch P, and in a particularly preferred solution, said distance is equal to or less than 25% of said pitch P.

Figure 7:
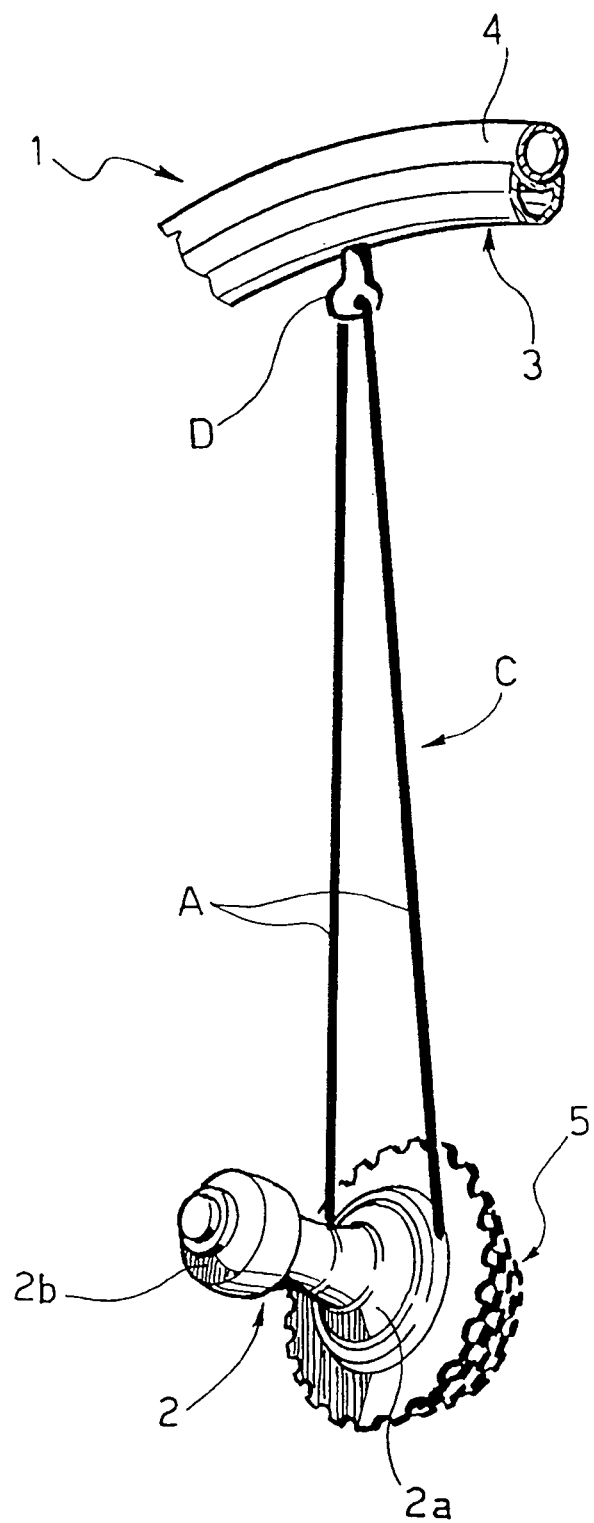
FIG. 7 is a partial perspective view of an alternate embodiment of the wheel according to the invention.
Figure 8:
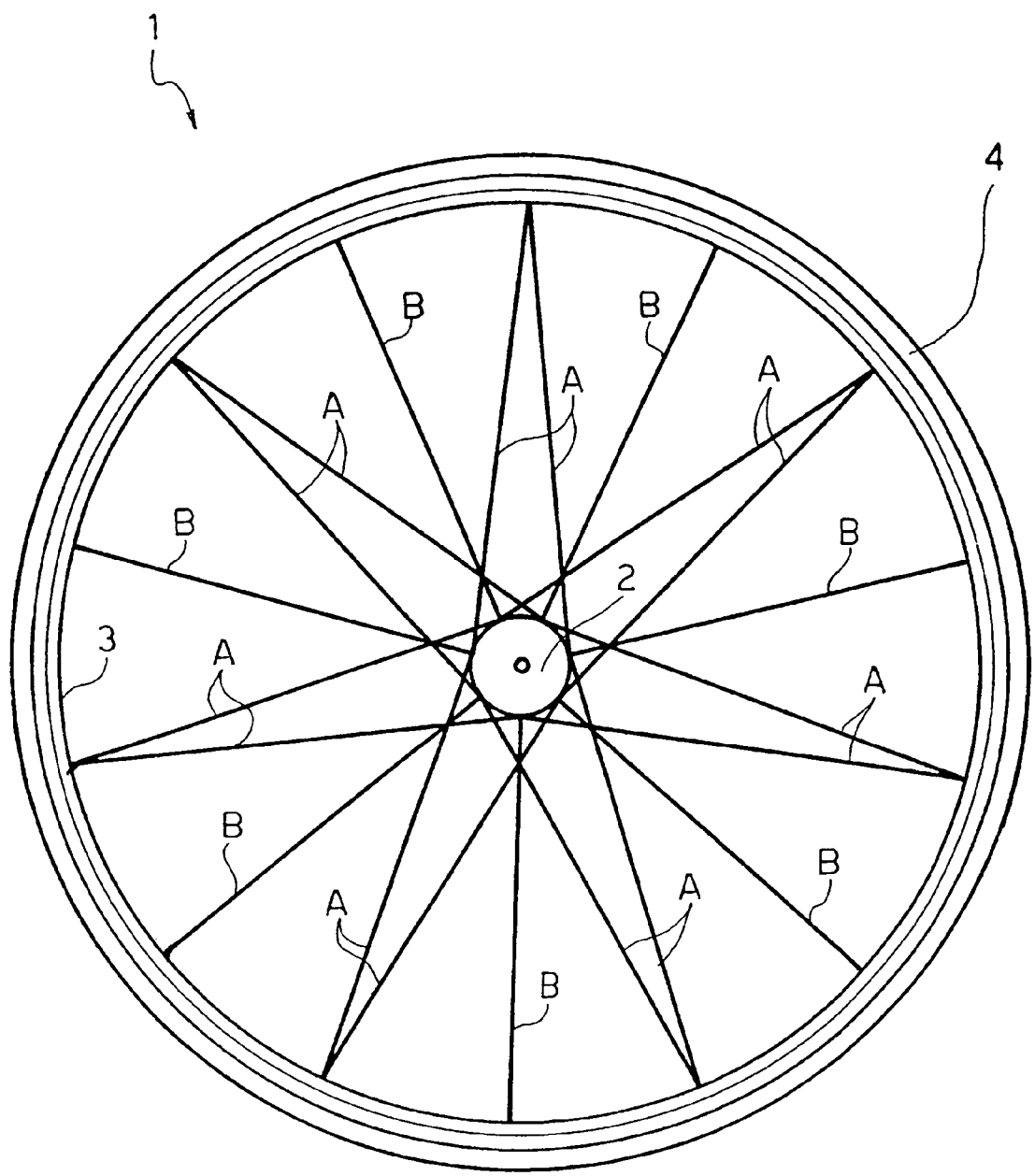
FIG. 8 illustrates a further alternate embodiment of the wheel according to the invention.
Figure 9:
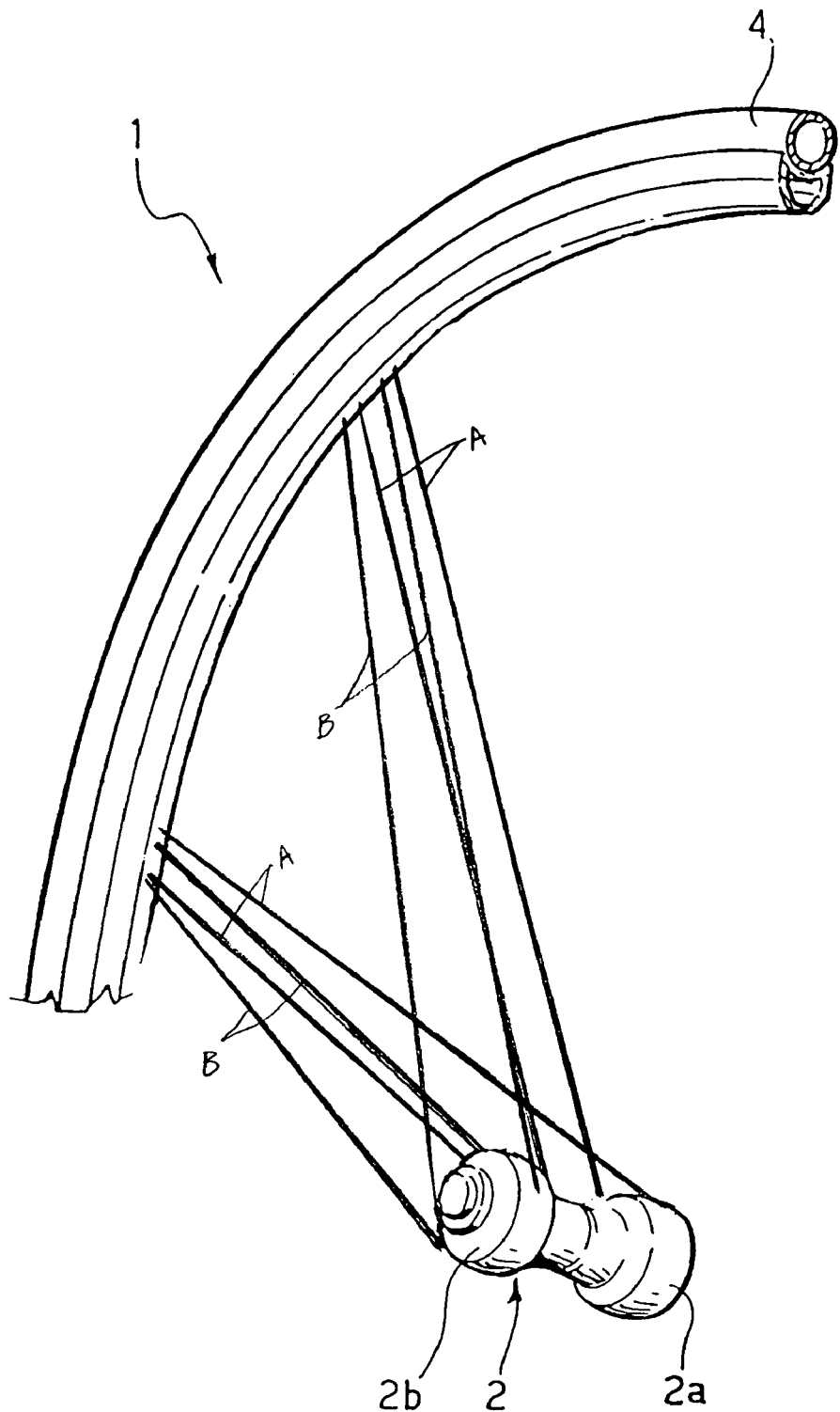
FIG. 9 is an alternate embodiment of the wheel according to the invention.
Figure 10:
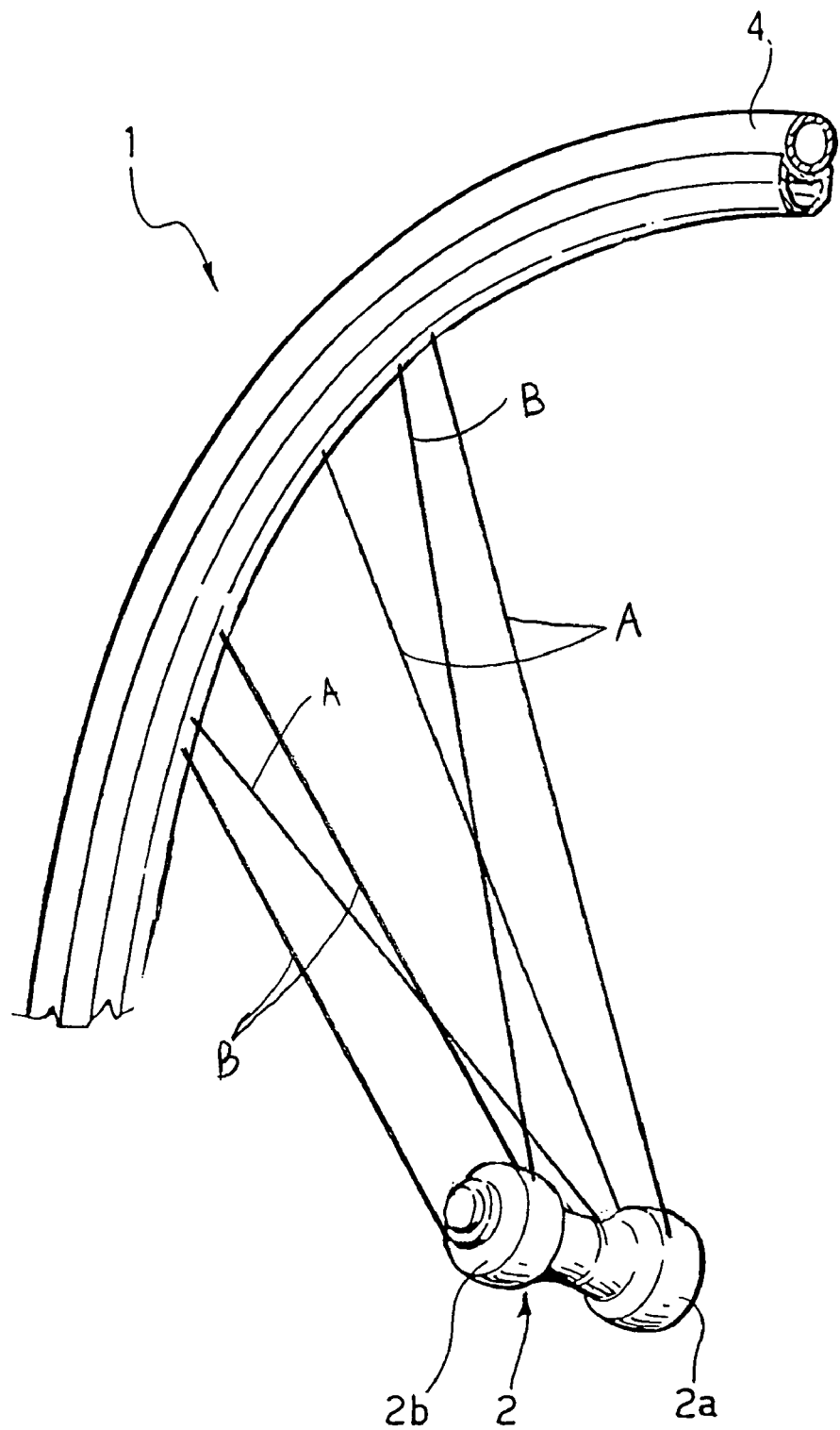
FIG. 10 is a further alternate embodiment of the wheel of the present invention.

In another embodiment, illustrated in FIG. 8, in a rim having a sufficient width, spokes A of the pair C may be connected to the rim substantially on the same point, by reducing the distance L between the two spokes A of the pair C substantially to zero. In a further embodiment illustrated in FIG. 7, spokes A of each pair C may converge in the same point of the rim, by means of connection element D provided with a connection means that makes it possible to simultaneously tension spokes A.

By the coupling of spokes A, each pair C of spokes A becomes structurally equivalent to a single spoke of a larger cross section without, however, increasing weight. This effect is further improved by the close coupling of the two spokes.

The distance L between the two spokes of the pair C is chosen so as to cause the tensile stress and the compressive stress (meant as reduction of the initial assembly tensile stress), transmitted simultaneously from the hub of the rear wheel (when the cyclist exerts force on the pedals) respectively to the two spokes of each pair C, generates locally, on the portion of the rim to which the spokes are connected, a much smaller moment than the one that would be generated with a traditional spoking and, namely, almost negligible, with a consequent low stressing of the rim itself.

In the example illustrated in FIG. 7, spokes A of each pair C originate from two diametrically opposite points of the hub. Spokes A converge with respect to one another towards the rim, according to two directions tangential to the axis of the hub, until they reach a distance apart at their outer ends that is smaller than the diameter of the hub and is considerably smaller than the distance between adjacent pairs C.

The aforesaid arrangement is particularly suited to a rear wheel. In a preferred embodiment, the number of pairs C of spokes A is equal to the number of spokes B. Therefore, the rear wheel has twice the number of spokes on the side of the spokes A, i.e., the side of the wheel on which the sprockets are arranged, than the number of spokes B on the opposite side.

This arrangement leads to important advantages from the point of view of structural strength of the wheel. In particular, the spokes' resistance to failure is enhanced and will be discussed below with reference to FIG. 6. This figure is a sectional view, corresponding to a view in the plane containing the axis of the wheel, which also illustrates the fork of the bicycle frame on which the wheel is mounted. The view of FIG. 6 is a hypothetical view, since it shows spoke B on the left-hand side of the wheel and a pair of spokes A (only one of which can be seen) on the right-hand side of the wheel, as if these spokes were in a common plane, whereas, in reality, they are in different planes.

Figure 6:
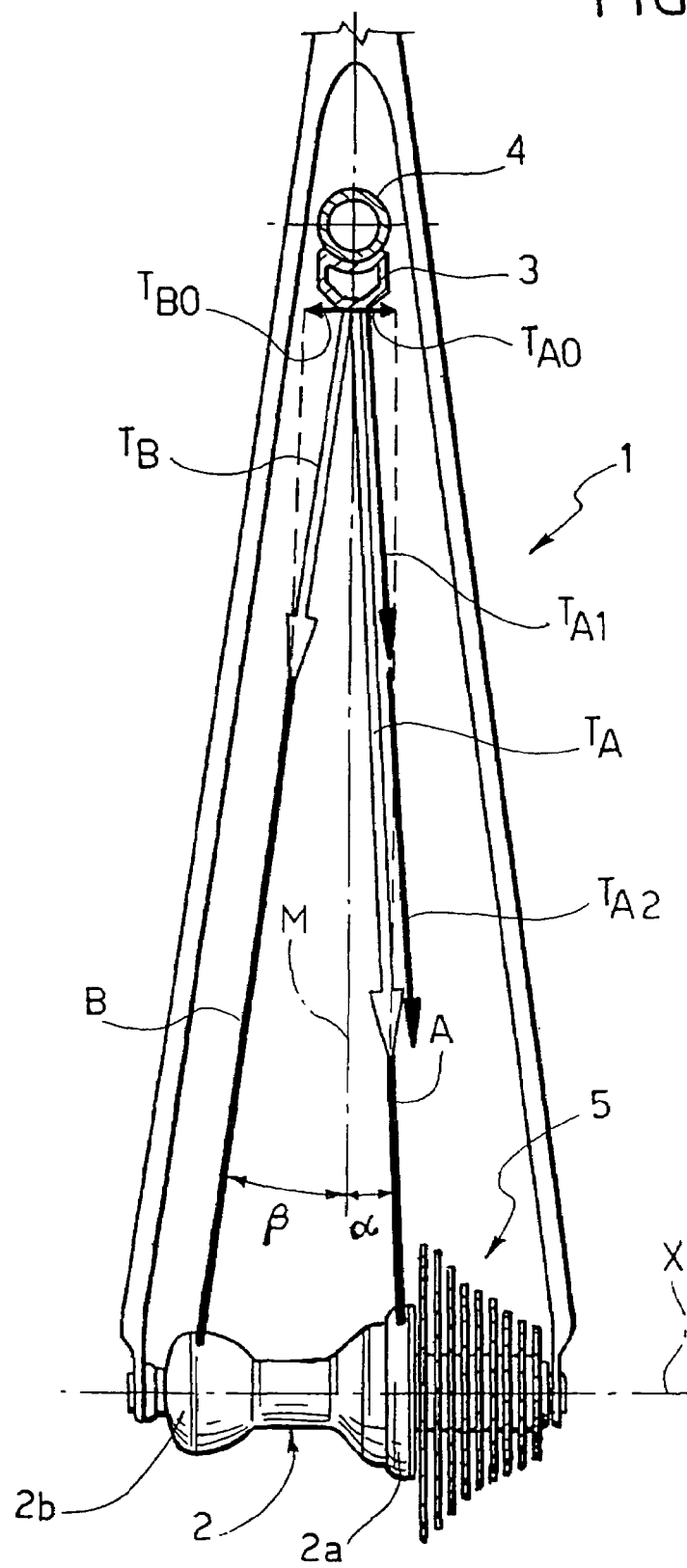
FIG. 6 is a sectional view used for illustrating some advantages of the invention with respect to the prior art.

When in use with a rear wheel, as seen in FIG. 6, the presence of the sprocket cassette 5 at one end of the hub 2 indicates that the spokes A set on that side of the hub will have an inclination $\alpha$ with respect to the median plane M of the wheel that is considerably smaller than the inclination $\beta$ with respect to the median plane M of the spokes B. The median plane M is defined as the plane orthogonal to the axis X of the hub that is substantially equidistant from the ends of the hub 2.

By convention, each spoke of the spoked wheel is mounted and applied with a given tensile force. In FIG. 6, $T_A$ and $T_B$ designate the components of tensile forces applied to the two-spoke set on the opposite sides of the wheel. The components of the two forces ($T_A$, $T_B$) in a direction parallel to the axis X of the wheel are generally designated by $T_{AO}$ and $T_{BO}$ in FIG. 6.

In conventional wheels having an equal number of spokes on the two sides of the wheel, in order for horizontal components $T_{AO}$ and $T_{BO}$ to be balanced with one another, so as to keep the rim 3 in the vertical plane M, it is necessary for the tensile force $T_A$ to be much higher than the tensile force $T_B$ due to its smaller inclination. To be precise, the ratio between the tensile force $T_A$ and the tensile force $T_B$ (of course always considering the tensile forces in the plane of FIG. 6) must be substantially equal to and opposite to the ratio of the sines of the angles of inclination $\alpha$ and $\beta$. This condition applies, in the conventional wheel, to each pair of spokes belonging to two different sides of the wheel and also applies, as a whole, with reference to the total tensile forces of the spokes set on one side and on the other side of the wheel. Furthermore, in conventional wheels, the tensioning of the spokes on the sprockets side is very high, with a consequent high risk of failure.

In view of the above, it is evident that the spoke arrangement according to the invention leads to important advantages. First of all, since the number of spokes A is twice the number of spokes B, the tensile force $T_A$ of each spoke A is substantially smaller than that required by a conventional wheel. Particularly, for each spoke B, the are two spokes A, so that for each tensile force $T_B$, there is a corresponding tensile force $T_A$, that is the sum of two tensile forces $T_{A1}+T_{A2}$ that the two spokes A of each pair apply as a whole to the rim 3. $T_{A1}$ and $T_{A2}$ are generally equal to one another, but could also be different.

Furthermore, it is important to note that, in the case of a typical rear wheel, the ratio between the sine of β and the sine of α is approximately of 2:1. Therefore, in the rim's balanced condition, each spoke A may be tensioned with a tensile force that substantially approaches that of each spoke B. In other words, when the components of the tensile forces of the spokes in radial planes containing the axis of the wheel are considered, all the spokes come to have tensile forces that are substantially equal to one another.

With reference to the sums of the tensile forces of the spokes on the two sides of the wheel, the balance condition of the tensile forces of the spokes in the direction of the axis of the wheel applies to the wheel as a whole.

The above advantages of the embodiment in FIGS. 2 and 3 namely, greater strength and resistance of the spokes, lower tensioning of the spokes on the sprocket side, and lower risk of failure of the spokes are all obtained without weight increase. These advantages are achieved with a relatively uniform distribution of the points of spokes anchoring on the rim. This uniform distribution provides optimal geometrical stability of the circular shape of the rim itself.

In addition to providing the substantial advantages discussed above, a wheel having a different number of spokes between the two camber angles as in this invention is particularly advantageous for a wheel which has an equal number of spokes for both of the camber angles. Although this is typically the case for a front wheel, an equal number of spokes for both of the camber angles may also be used for a rear wheel.

Figure 4:
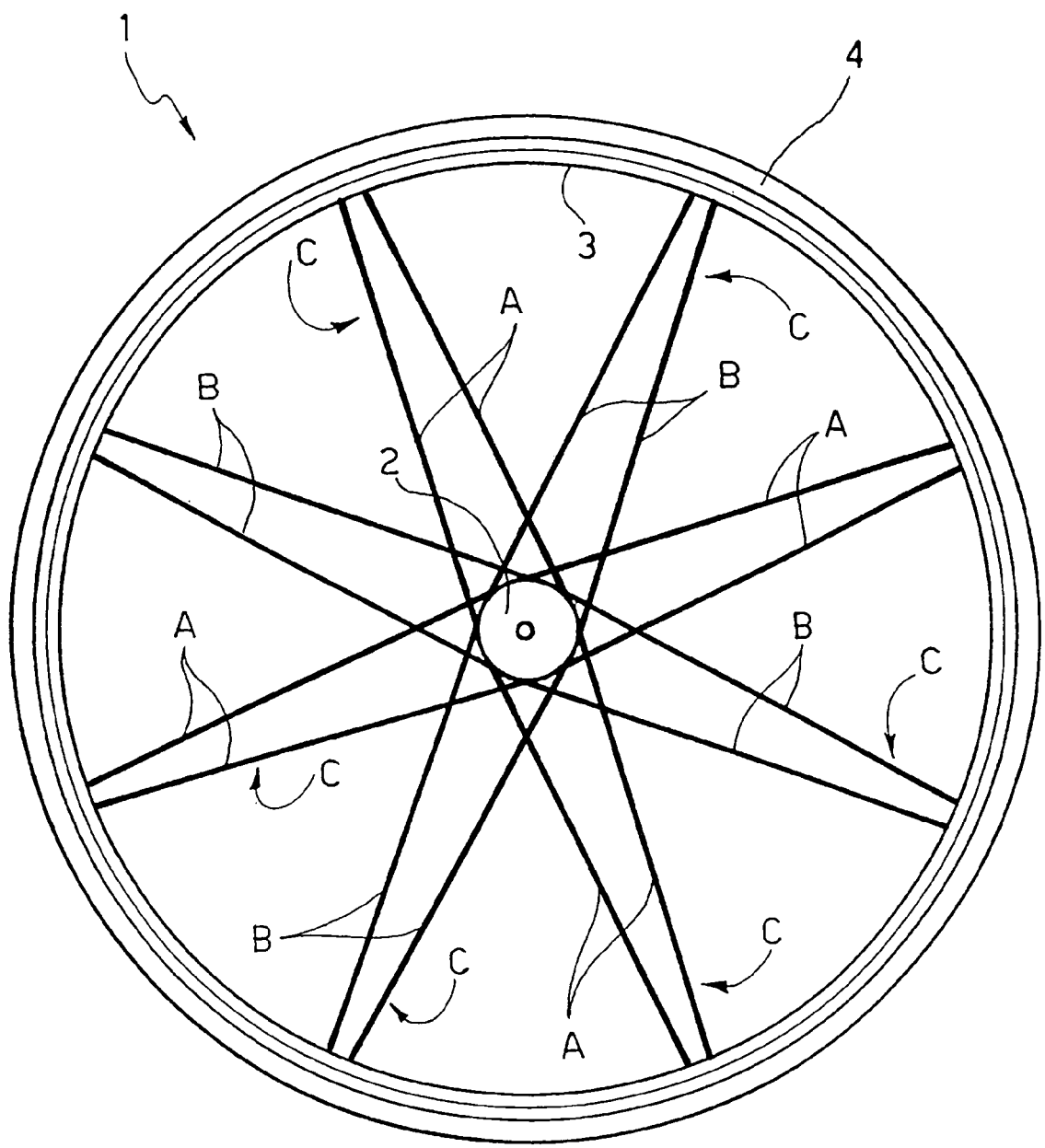
FIG. 4 illustrates a second embodiment of the wheel according to the invention, viewed in the direction of the axis of the wheel.
Figure 5:
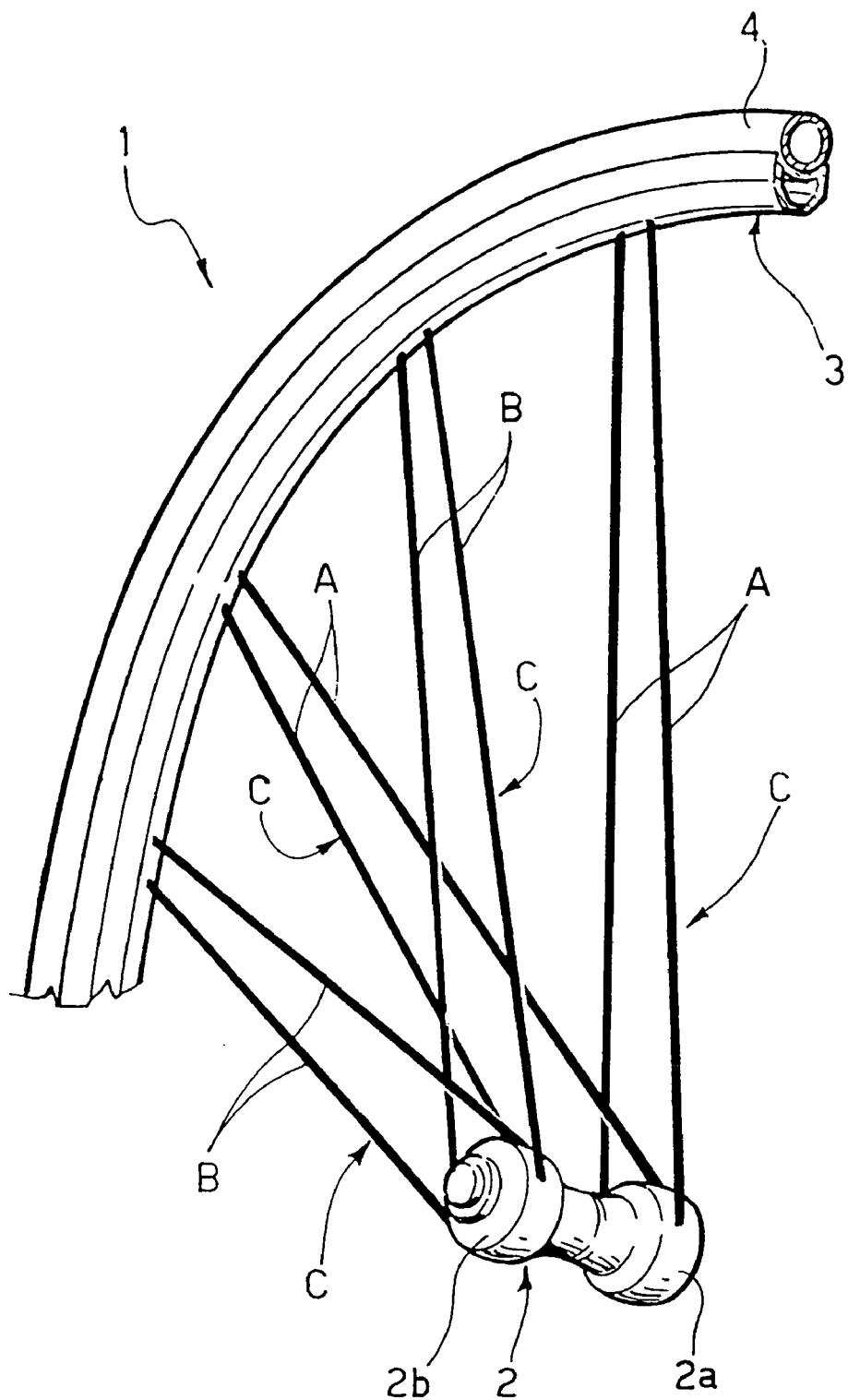
FIG. 5 is a perspective view, of a detail of the wheel of FIG. 4.

An example of this embodiment is illustrated in FIGS. 4 and 5. In the case of the embodiment of FIGS. 4 and 5, spokes B of the second set are grouped into pairs, which are arranged at equal distances apart from one another and alternated angularly between spoke pairs A. In this arrangement, the spokes on the two sides of the wheel are equal in number.

Alternatively, it is possible to arrange both spokes A and spokes B in pairs on both sides of the wheel. The pairs on the two sides have the same angular positions, so that in each rim area where the spokes attach, two pairs of spokes belonging, respectively, to the two sides of the wheel converge, see FIG. 9. It is also possible that on one or both sides of the wheel, pairs of spokes alternate with single spokes, which are also set on the same side, see FIG. 10.

As is evident from the foregoing description and from the appended drawings, the invention provides a new wheel arrangement with an innovative technical solution and an original aesthetic appearance.

What is claimed is:

1. A spoked bicycle wheel comprising a rim (3), a hub (2) having an axis (X) and a median plane (M) perpendicular to the axis (X) and a first array of anchoring portions (2a) and a second array of anchoring portions (2b) for anchoring spokes, and a plurality of spokes connecting the hub (2) to the rim (3), by a first set of spokes (A) connected to the first array of anchoring portions (2a) and a second set of spokes (B) connected to the second array of anchoring portions (2b), wherein all spokes of each set of spokes are on a same side of the median plane while the first set and the second set are on opposite sides of the median plane, and wherein at least two spokes of the first set (A) are grouped together to form a pair (C) in which no spoke of the second set of spokes is interposed.

2. The spoked wheel of claim 1, wherein the points of attachment to the rim (3) of the spoke pair (C) are proximate one another.

3. The spoked wheel of claim 2, wherein the points of attachment to the rim (3) of the spoke pair (C) present a distance (L) equal to or less than 60% of the pitch (P) of a conventional wheel having the same total number of spokes.

4. The spoked wheel of claim 2, wherein the points of attachment to the rim (3) of the spoke pair (C) present a distance (L) equal to or less than 40% of the pitch (P) of a conventional wheel having the same total number of spokes.

5. The spoked wheel of claim 2, wherein the points of attachment to the rim (3) of the spoke pair (C) present a distance (L) equal to or less than 25% of the pitch (P) of a conventional wheel having the same total number of spokes.

6. The spoked wheel of claim 2, wherein the points of attachment to the rim (3) of the spoke pair (C) present a distance (L) approaching zero.

7. The spoked wheel of claim 6, wherein the points of attachment to the rim (3) of the spoke pair (C) (A) coincide in a single point of attachment to the rim (3).

8. The spoked wheel of claim 1, wherein all the spokes belonging to said first set of spokes (A) are grouped together in pairs (C) set at angular distances apart from one another.

9. The spoked wheel of claim 1, wherein at least two spokes of the second set of spokes (B) are grouped together into pairs (C).

10. The spoked wheel of claim 9, wherein the points of attachment to the rim (3) of the second set spoke pair (C) (B) are proximate one another.

11. The spoked wheel of claim 9, wherein all the spokes belonging to said second set of spokes (B) are grouped together into pairs (C) set at angular distances apart from one another.

12. The spoked wheel of claim 11, wherein the pairs (C) of spokes (B) of the second set are alternated at angular distances with the spoke pairs (C) of the first set.

13. The spoked wheel of claim 11, wherein the spoke pairs (C) of the second set are in angular positions which substantially coincide with those of the spoke pairs (C) of the first set.

14. The spoked wheel of claim 1, wherein each spoke A pair (C) is made up of two spoke sets extending along two tangential directions with respect to the axis of the wheel.

15. The spoked wheel of claim 14, wherein the two A tangential directions converge radially outwardly.

16. The spoked wheel of claim 1, wherein the points of attachment to the rim (3) of the spoke pair (C) present a distance (L) smaller than a maximum diameter of the hub (2).

17. The spoked wheel of claim 1, wherein the number of spokes of the first set (A) is greater than the number of spokes of the second set (B).

18. The spoked wheel of claim 17, wherein the number of spokes of the first set (A) is twice the number of spokes of the second set (B).

19. The spoked wheel of claim 18, wherein the spokes (B) of the second set are single spokes.

20. The spoked wheel of claim 19, wherein the single spokes (B) of the second set are angularly interposed with the spoke pairs of the first set.

21. The spoked wheel of claim 19, wherein the spokes (B) of the second set extend radially if viewed in the direction of the axis of the wheel.

22. The spoked wheel of claim 1, wherein tensions of the spokes (A) of the first set and the tensions of the spokes (B) of the second set are substantially balanced with respect to one another in the direction of the axis of the wheel.

23. The spoked wheel of claim 1, wherein the spokes of the first set (A) present an inclination ($\alpha$) with respect to a median plane (M) of the wheel that is smaller than an inclination ($\beta$) of the spokes (B) of the second set with respect to said median plane (M).

24. The spoked wheel of claim 23, wherein the sum of tensile forces of the spokes (A) of the first set, in respective radial planes containing the axis of the wheel, and the sum of the tensile forces of the spokes (B) of the second set, in respective radial planes containing the axis of the wheel, are in a ratio to one another that is equal to the inverse ratio ($\sin\beta/\sin\alpha$) between the sines of the respective angles of inclination ($\alpha$, $\beta$).

25. The spoked wheel of claim 1, wherein the spoke pairs (C) of the first set are arranged at equal distances apart.

26. The spoked wheel of claim 25, wherein the spoke pairs (C) of the second set are arranged at equal distances apart.

27. The spoked wheel of claim 26, wherein each spoke pair (C) of the second set is arranged in a position equidistant between two adjacent spoke pairs (C) of the first set.

28. The spoked wheel of claim 25, wherein the single spokes (B) of the second set are evenly spaced apart.

29. The spoked wheel of claim 28, wherein each spoke (B) of the second set is arranged in a position equidistant between two adjacent spoke pairs (C) of the first set.

30. The spoked wheel of claim 29, wherein it is a rear wheel.

31. The spoked wheel of claim 18, wherein the side of the wheel with twice the number of spokes is the one corresponding to the portion of the hub which carries a sprocket cassette (5).

32. The spoked wheel of claim 12, wherein the wheel comprises an identical number of spoke pairs of the first set and of the second set.

33. The spoked wheel of claim 12, wherein the wheel is a front wheel.

34. The spoked wheel of claim 8, wherein the number of spoke pairs of the first set is between four and fourteen.

35. The spoked wheel of claim 11, wherein the number of spoke pairs of the second set is between 4 and 14.

36. The spoked wheel of claim 19, wherein the number of single spokes of the second set is between four and fourteen.

37. The spoked wheel of claim 7, wherein the two spokes (A) of each pair (C) converge until they are joined together by a connection element (D) to the rim.

38. The spoked wheel of claim 37, wherein said common connection element is provided with connection means to the rim that make it possible to simultaneously tension the spokes of said pair.

* * * * *